(12) United States Patent
Winwood

(10) Patent No.: US 6,983,290 B2
(45) Date of Patent: Jan. 3, 2006

(54) APPARATUS AND METHOD FOR ACCESSING RESOURCES

(75) Inventor: Paul Winwood, Oxford (GB)

(73) Assignee: Software 2000 Ltd., (GB)

( * ) Notice: Subject to any disclaimer, the term of this patent is extended or adjusted under 35 U.S.C. 154(b) by 544 days.

(21) Appl. No.: 10/191,295

(22) Filed: Jul. 10, 2002

(65) Prior Publication Data

US 2003/0037057 A1 Feb. 20, 2003

(30) Foreign Application Priority Data

Aug. 6, 2001 (GB) .................................... 0119190

(51) Int. Cl.
G06F 17/00 (2006.01)

(52) U.S. Cl. .................. 707/104.1; 707/101; 707/102; 707/100; 707/3

(58) Field of Classification Search ..... 707/100–104.1, 707/1–4; 709/217; 705/1
See application file for complete search history.

(56) References Cited

U.S. PATENT DOCUMENTS

| 5,864,852 | A | | 1/1999 | Luotonen |
| 2001/0034771 | A1 | * | 10/2001 | Hutsch et al. ............... 709/217 |
| 2002/0049608 | A1 | * | 4/2002 | Hartsell et al. ................ 705/1 |
| 2002/0059274 | A1 | * | 5/2002 | Hartsell et al. ............. 707/100 |
| 2002/0095400 | A1 | * | 7/2002 | Johnson et al. ................ 707/1 |

* cited by examiner

*Primary Examiner*—Mohammad Ali
*Assistant Examiner*—Sana Al-Hashemi
(74) *Attorney, Agent, or Firm*—Foley Hoag LLP; Ruth J. Ma

(57) ABSTRACT

A resource processing technique is disclosed for accessing resources included within larger files. When a file including resource data is stored fixed identification data for the file is associated with data identifying the storage location of that file. Subsequently, when a data access request including resource identification data and fixed data corresponding to the file is processed a resource is retrieved where the retrieved resource is selected utilizing the data identifying the storage location associated with the fixed data within the file request.

14 Claims, 6 Drawing Sheets

APPARATUS AND METHOD FOR ACCESSING RESOURCES

BACKGROUND OF THE INVENTION

1. Field of the Invention

The present application concerns apparatus and methods for accessing resources. In particular the present application concerns apparatus and methods for accessing resources such as HTML scripts or bit maps included as part of larger application files.

2. Background Information

The Internet provides a convenient means by which data such as bit maps, HTML (Hypertext Mark-up Language) scripts, Java files and other resources may be accessed remotely. When files are accessed via the Internet, files are identified by a URL (Uniform Resource Locator). URLs comprise two parts, a scheme part identifying a protocol for downloading a resource and a scheme specific portion identifying the location of the resource. Thus for example an Internet address of the form 'http' followed by a semicolon (:), two backslashes (//), and a web address, such as 'sw2000.com' indicates that data located in the root directory of the computer corresponding to the address www.sw2000.com should be downloaded utilizing the hypertext transfer protocol.

Transfer protocols such as the hypertext transfer protocol (http:) and the file transfer protocol (ftp:) are file based protocols. This is to say the scheme specific portion of a URL using such protocols comprises data identifying a specific file stored on a computer.

Sometimes, however, it is desirable to access resources which are stored as part of a larger application file. The inclusion of such resources within larger files enables the entire file to be, for example, encrypted and check summed to ensure that the resource included within the application file is not maliciously or accidentally modified.

A separate protocol called the 'res' protocol has been developed by Microsoft to enable resources bound within larger application files to be accessed. As the resources included within larger application files cannot be identified by a file name. The scheme specific portions of a URL utilizing the conventional 'res' protocol therefore comprise an explicit URL identifying the location in the file system where the larger application file including the resource has been stored and data identifying the relative location within that application file where the particular resource is to be found.

The requirement that URLs utilizing the 'res' protocol include explicit URLs identifying the file location where an application is stored can cause difficulties.

Specifically, when an application is installed, the location in the file system where the application is stored is fixed by the application installer. This means that after installation references utilizing the 'res' protocol must be checked and if necessary amended so as to refer to the location in the file system where the file has actually been stored. Manual checking and editing is both time consuming and error prone and as a result the 'res' protocol has been little used.

In view of the above, there is a need for an alternative resource accessing technique for accessing resources included within larger application files which overcomes the limitations of the 'res' protocol.

SUMMARY OF THE INVENTION

In accordance with one aspect of the present invention there is provided a method of accessing data included within an application file comprising the steps of:
   storing an application file containing data to be accessed in a storage device at an identified location;
   storing data identifying said application file and said identified location; and
   processing a reference to a resource included within said application file, said reference comprising data identifying said application file and data identifying the location of said resource within said application file, by accessing a resource stored at a location selected utilizing said data identifying a location stored in association with data identifying said application file.

BRIEF DESCRIPTION OF THE DRAWINGS

Further aspects and objects of the present invention will become apparent with reference to the following description and accompanying drawings in which.

DETAILED DESCRIPTION OF AN ILLUSTRATED EMBODIMENT

One way of accessing resources included within larger application files is for an access request to identify the location where the larger application file is stored. However, when an application file is installed on a computer, the location to which files that comprise the application are copied is usually under the control of the installer. This means that an application writer cannot know in advance exactly where within a file system their application file will necessarily be stored. This makes accessing resources included within larger application files difficult.

In accordance with one aspect of the present invention a two stage resource accessing technique is provided which avoids this problem. Firstly, when an application file is stored, fixed identification data for the file is associated with data identifying the file's actual storage location. Subsequently, when a resource within the application file is to be accessed a data access request including the fixed identification data can be utilized and processed to establish the application file's storage location. Resources within the application data can then be accessed.

A first embodiment of the present invention will now be described.

First Embodiment

Figure 1:
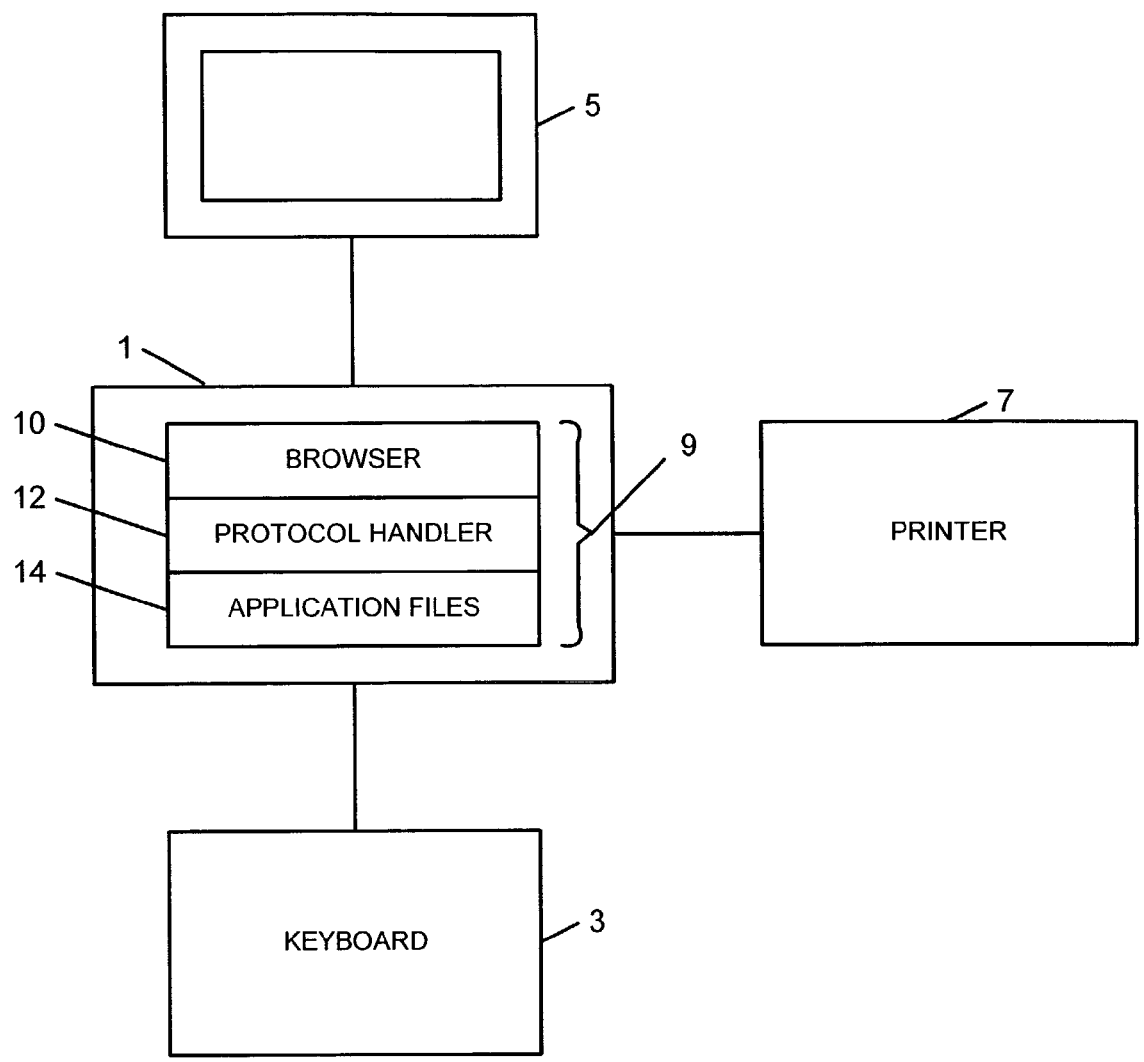
FIG. 1 is a schematic block diagram of a first embodiment of the present invention.

FIG. 1 is a schematic block diagram of a first embodiment of the present invention. The embodiment of FIG. 1 comprises a computer 1 that is attached to a keyboard 3, a display 5 and a printer 7. Stored within the memory 9 of the computer 1 are a browser program 10 being a conventional browser program such as Internet Explorer (TM), a protocol handler 12 for processing references to resources as will be described in detail later and a number of application files 14, at least some of which include resources which it is desired to be accessible utilizing the browser 10 and protocol handler 12.

Thus for example one of the application files 14 might be a printer driver for controlling the processing of the printer 7. It may be desirable to enable the user interface of the printer driver application file to be accessible using the browser 10. To this end part of the printer driver application file would include a number of dialogue templates setting out the format of a screen display to be generated and shown on the display 5 and a number of resources such as HTML scripts, bit maps to be displayed as part of a screen display on the display 5 in the format identified by the table. Also stored as part of an application file could be Java script programs identifying the processing to occur when portions of a user interface generated from the dialogue templates, HTML scripts and bit maps are selected, using for example the keyboard 3.

In accordance with this embodiment of the present invention, the protocol handler 12 is arranged to enable the browser program 10 to generate user interfaces accessing resources included within larger application files 14. Specifically as will be described in detail later, provided within the protocol handler 12 are an initialisation module and a bound resource processing module which enable references to an application file and a position within an application file to be converted into a reference to a specific storage location. The specific storage location is then utilized to select a resource included within the larger application file for processing as part of, for example a user interface.

Figure 2:
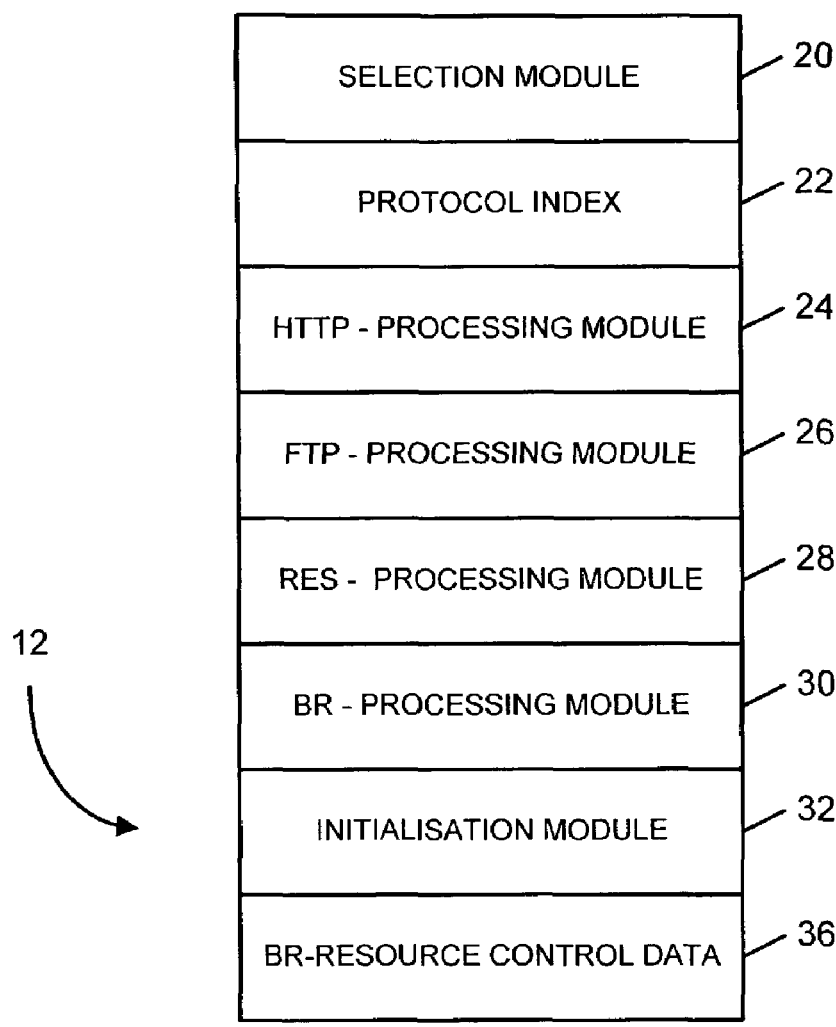
FIG. 2 is a schematic block diagram of the protocol handler of FIG. 1.

FIG. 2 is schematic block diagram of the protocol handler 12 of FIG. 1. In this embodiment the protocol handler 12 comprises: a selection module 20 for selecting a protocol for processing a reference, a protocol index 22 identifying the processing protocols, the protocol handler 12 is able to handle; an HTTP (Hypertext Transfer Protocol) processing module 24, an FTP (File Transfer Protocol) processing module 26 and a RES (resource) processing module 28. Each of the HTTP, FTP and RES processing modules 24,26,28 comprises a conventional processing module for processing URL reference in accordance with the HTTP, FTP and res protocols respectively.

Additionally, in this embodiment, the protocol handler 12 comprises a bound resource (BR) processing module 30, an initialisation module 32 and a storage area 36 for storing bound resource of control data.

As will be described in detail later the initialisation module 32 causes data to be stored as bound resource control data 36 which enables references to the name of an application file 14 to be converted into data identifying a storage location where the application file itself is stored. When the bound resource processing module 30 is then selected by the selection module 20 to process a URL, the bound resource processing module 30 first identifies the storage location associated with the name of an application file identified by the first portion of the scheme specific portion of the URL being processed. The remainder of the scheme specific portion of the URL is then processed and utilized to determine an off-set relative to this memory location to identify the storage location of a resource which is to be utilized. When the location of the resource has been determined the identified resource is processed in a conventional manner.

By providing references in this manner the bound resource processing module 30 provides a means by which resources within application files 14 can be accessed without the URL's identifying the resources explicitly identifying the location where a resource is stored. As the relative location of a resource within an application file can be known prior to loading the response within a computer 1, utilizing this resource accessing system therefore avoids the need to amend URL's after an application has been loaded as is required utilizing the RES protocol.

Figure 3:
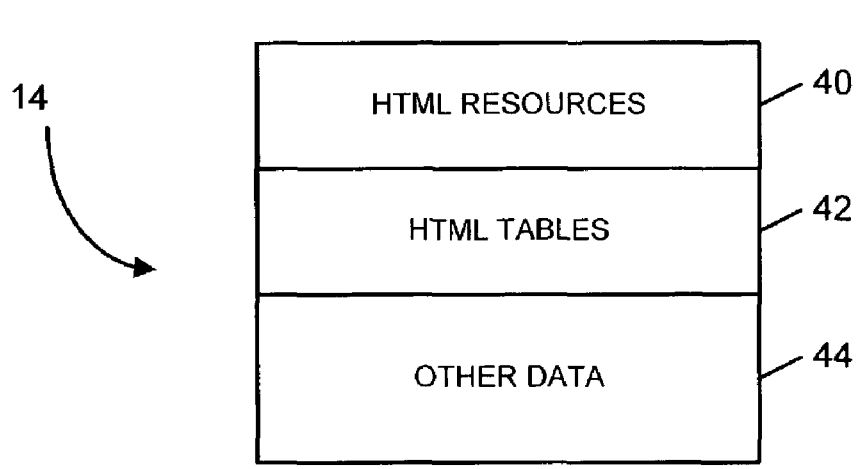
FIG. 3 is a schematic block diagram of an exemplary application file.

FIG. 3 is a schematic block diagram of an example of an application file 14 in accordance with this embodiment of the present invention. In this example the application file 14 comprises HTML resources 40, HTML tables 42 being dialogue tables for formatting screen display and other data 44 such as bit map images and java files.

Each of the HTML resources, HTML tables and each item of other data comprises two parts: a header comprising label data, and a main body comprising the resource or item of other data itself. The label data enables a resource of other item of data to be retrieved using a reference to the label data. Thus for example a bit map image for generating an image of a button might be associated with the label data "buttonone". A reference including the label "buttonone" can then be used to access the bit map image by searching the file for data matching the label in the reference. The resource or other item of data following the label can then be processed and utilized.

Prior to describing in detail the processing of the initialisation module 32 and bound resource processing module 30, the interaction of the browser program 10 and the protocol handler 12 will first be described.

Figure 4:
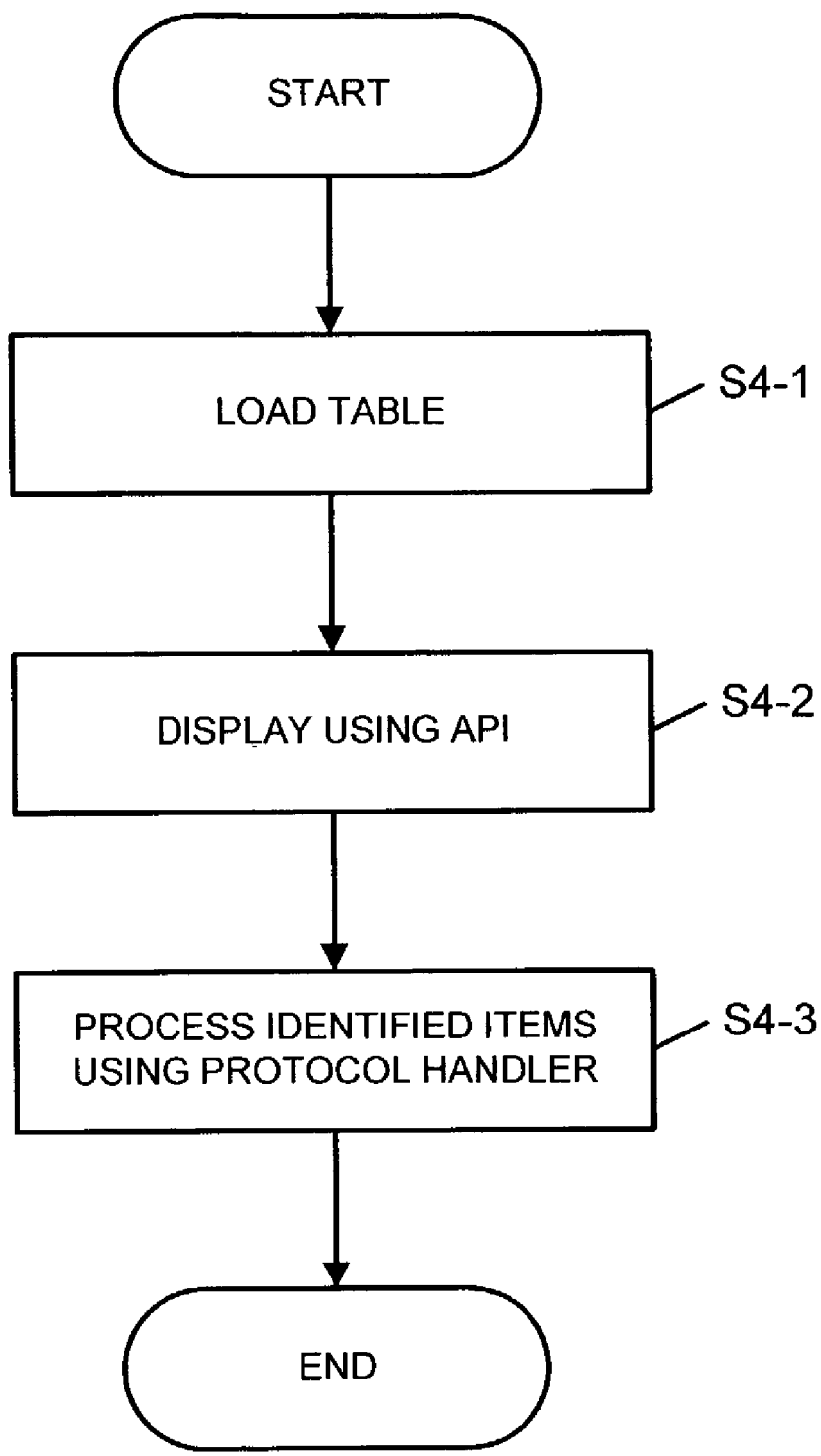
FIG. 4 is a flow diagram of the processing of the browser of FIG. 1.

FIG. 4 is a flow diagram of the processing of the browser program 10 and the protocol handler 12.

Initially when the browser program is requested to display a user interface, a table comprising a dialogue template is loaded into memory (S4-1). The dialogue template comprises data defining the lay out of a user interface and associates portions with a screen display with further resources identifying, for example HTML scripts and bit maps to be displayed as part of the user interface together with, for example, Java script files identifying the processing to be associated with selection of different portions of a user interface.

After the table has been loaded into memory, the browser program 10 then (S4-2) causes a user interface to be displayed utilizing a conventional API (asynchronous pluggable interface) to generate the display data causing a display to be shown on the screen 5. In this initial display images and text represented by the resources are represented by place markers of an appropriate size and shape.

The browser program 10 then proceeds to process (S4-3) the URL's identifying other resources to be included within the display. When processing URL's within the table identifying other resources, each of the other resources is obtained and processed using the protocol handler 12 which interprets a URL to determine how the resource identified by the URL is to be downloaded and a location from which that data is to be downloaded. The downloaded resource is then displayed on the appropriate portion of the screen.

Specifically whenever reference to a URL is encountered within the table, the browser 10 invokes the selection module 20 of the protocol handler 12. The selection module 20 then checks the scheme portion of the URL against the protocol index 22. This protocol index 22 identifies the protocols that the protocol handler 12 is able to process. If the scheme portion of the URL encountered is determined to correspond to one of the protocols identified by the protocol index 22, the selection module 20 then invokes the protocol processing module 24, 26, 28, 30 identified as being suitable for processing the identified type of URL.

Thus for example if the browser 10 is processing a URL such as http followed by a semicolon, two backslashes, and the web address www.sw2000.com\home.html, the browser when processing the reference passes the reference to the selection module 20 which then compares the scheme portion of the URL, in this case 'http:' with protocols identified by the protocol index 22. In this case the selection module 20 would then proceed to select as the suitable protocol module the http protocol module 24 and then process the reference by invoking the http processing module 24 which would then retrieve the resource utilizing the scheme specific portion of the URL. The retrieved resource is then displayed in the appropriate portion of the screen.

Thus in this way by providing URLs with different scheme parts, different ways of processing scheme specific portions of the URL can be utilized.

The processing of the protocol handler 12 in accordance with this embodiment of the present invention will now be described in detail.

In this embodiment of the present invention in order to provide a new means for accessing resources included within application files 14, reference to a bound resource protocol is included in the protocol index 22 such that when a URL starting 'br' it is detected the protocol index 22 identifies the bound resource processing module 30 as the processing module suitable for processing such a reference.

Specifically in this embodiment the URL including the 'br:' is made to comprise three parts. These three parts comprise the scheme part, being the text 'br:\\' which identifies the URL as being suitable for processing by the bound resource processing module 30, a file identifier, being the name of an application file which includes the resource to be accessed, and a reference corresponding to label data of the header of the resource or other item of data which is to be accessed.

Thus for example a complete bound resource protocol URL might be:

br:\\printerdriver\buttonone.bmp

Where the letters br indicate a URL to be processed using the bound resource processing module 30, 'printer driver' being the name of a file within which a resource to be accessed is included and "buttonone.bmp" being the label data of the resource to be accessed.

In order that these three part URL's can be utilized to access the identified resources, it is necessary for the bound resource processing module 30 to be able to identify the storage location for a resource from the file name and a reference to label data for a resource. In this embodiment, this is achieved by the bound resource processing module 30 utilizing bound resource control data 36 generated by the initialisation module 32. The processing of the initialisation module 30 will therefore now be described.

Figure 5:
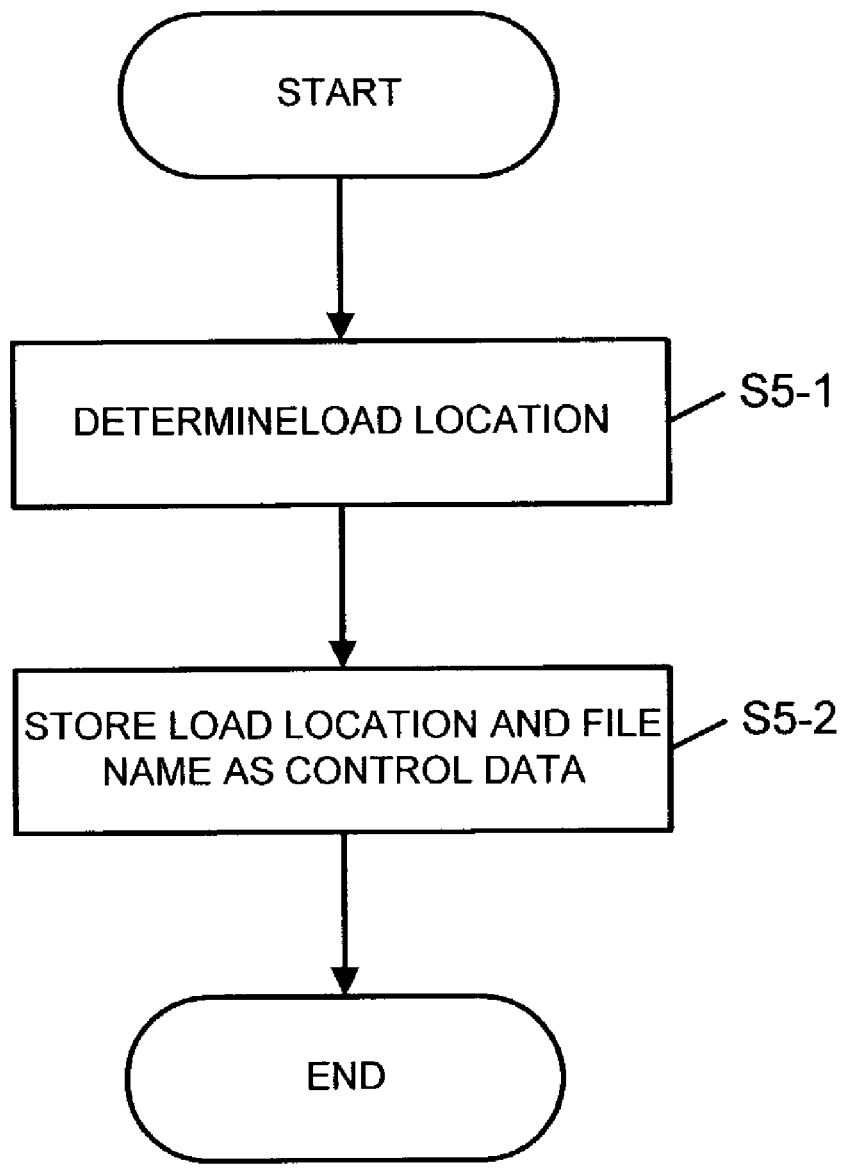
FIG. 5 is a flow diagram of the processing of the initialisation module of FIG. 2.

FIG. 5 is a flow diagram of the processing of the initialisation module 32 of a protocol handler 12 in accordance with this embodiment of the present invention.

The initialisation module 32 is invoked whenever an application file 14 is loaded into the memory 9 of the computer 1. When an application file is loaded into the memory 9 of the computer 1, the initialisation module 32 then (S5-1) determines load location of the newly loaded application file 14. This load location comprises data identifying a memory location being the first memory location occupied by the newly loaded application file 14.

The initialisation module 32 then (S5-2) proceeds to store as bound resource control data 36, data comprising the identified memory location and data identifying the name of the application file 14 that has just been loaded into memory 9.

Thus for example if an application file called 'printerdriver' were to be loaded into memory 9 at memory location #96AEF the initialisation module 32 would store as bound resource control data 36 data comprising the name of the application file stored and the memory location being the memory location of the beginning of the printer driver. Thus in this case the following data would be stored:

printerdriver:#9AEF

After data identifying an application file name and the memory location at which the application file has been stored as resource control data 36 the processing of the initialisation module 32 ends.

Thus by invoking the initialisation module 32 every time an application file 14 is stored in memory 9, a list of application file names and associated memory locations is stored as bound resource control data 36.

Figure 6:
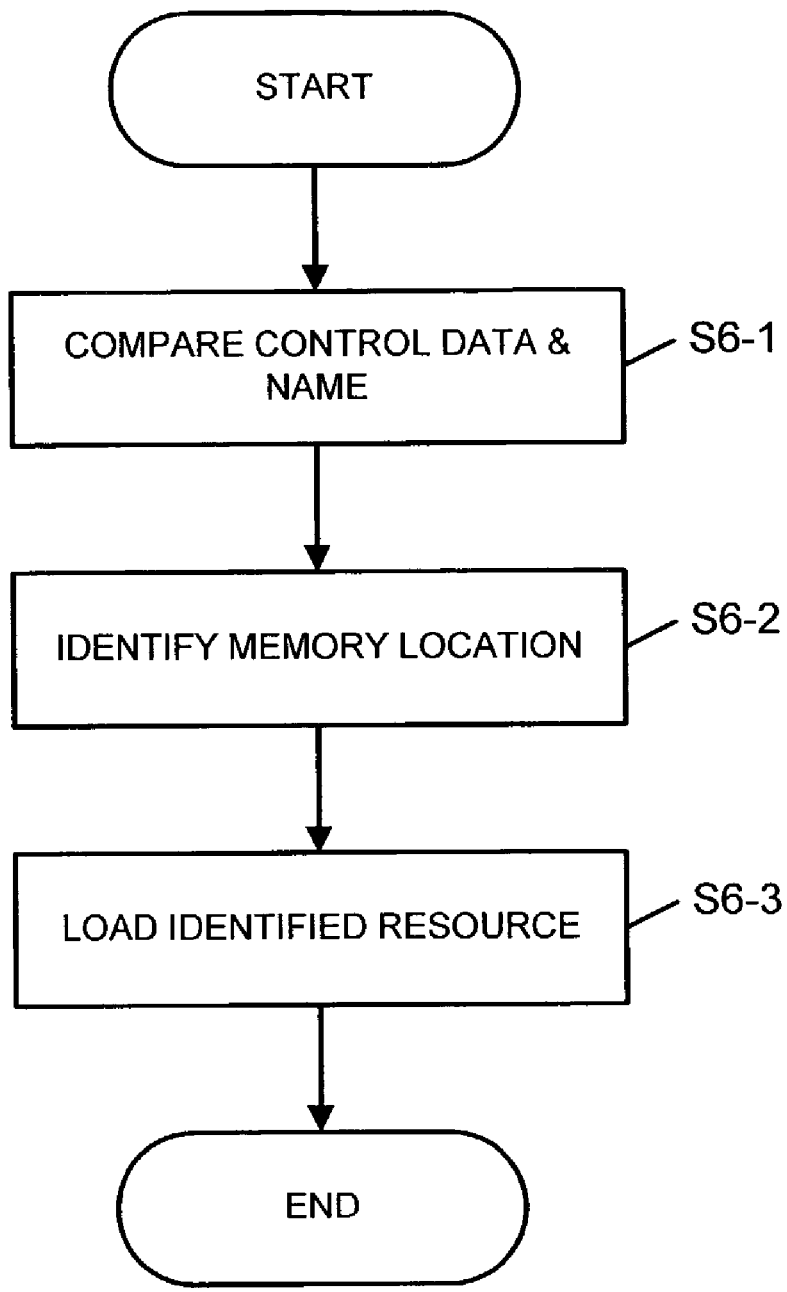
FIG. 6 is a flow diagram of the processing of the bound resource processing module of FIG. 2.

The processing of the bound resource processing module 30 in accordance with this embodiment of the present invention will now be described with reference to FIG. 6.

Initially, when the bound resource processing module 30 is selected by the selection module 20 as the processing module suitable for processing a URL, the scheme specific portion of the URL is passed to the bound resource processing module 30. The bound resource processing module 30 then (S6-1) compares the file name included as part of the received URL with file names associated with memory locations stored as bound resource control data 36.

Thus for example in the case of the above bound resource URL br:\\printerdriver\buttonone.bmp the bound resource processing module 30 would identify within the control data 36 data associated with the file name 'printerdriver'.

When a match for the file name of the URL has been found within bound resource the control data 36, the bound resource processing module 30 then (S6-2) determines from the identified control data 36 and the remaining portion of the bound recourse protocol URL a memory location for a resource to be processed. In this embodiment this memory location is determined by searching for data matching the label data reference in the URL starting the search from the memory location identified by the control data 36.

Thus for example when processing a bound resource protocol URL:

br:\\printerdriver\buttonone.bmp

If the initialisation module 32 has previously stored data corresponding to the location of a file "printerdriver" and memory locations #96AEF, the bound resource processing module will then search for data corresponding to the label "buttonone.bmp" in memory locations starting from memory locations #96AEF until a match for the label data has been found.

The bound resource processing module 30 then processes (S6-3) the resource at the identified storage location next to the memory location storage data matching the label data. The identified resource is processed in the same way in which a conventional res processing module 28 would process an explicit URL identifying the same storage location. Thus for example, in the case of the above URL and control data, a resource for example a bit map image or html script, stored at memory location next to the memory location storing data matching the label data "buttonone.bmp" would be loaded and processed in a conventional manner.

Thus in this way, whilst the URLs to be processed by a protocol handler 12 comprise data identifying a file name and label data for a resource within a named file, the bound resource processing module 30 is able to convert these URLs into explicit URLs identifying actual storage locations whenever the browser program 10 causes the protocol handler 12 to process reference to such bound resources.

Second Embodiment

Although in the above embodiment a system has been described which a protocol handler 12 is provided which can process references to bound resources where bound resources are identified by a file name and label data, it will be appreciated that during development of an application file, it may not be possible to search for label data for a resource within a file until development has been completed. A second embodiment of the present invention will now be described in which the bound resource protocol module 30 is adapted to enable bound resource protocol references to be utilized during development of an application file.

In this embodiment in addition to the initialisation module 32 it is arranged to generate and store resource control data 36, and administration module is provided which enables a developer to input control data which is then stored directly as bound resource control data 36. In this embodiment this manually input control data comprises data associating a file name and label data with a file location, being the location of a resource file being developed prior to the resource file being bound within a larger application file.

Thus for example manually input control data might comprise the following:

| 'printerdriver\image1' |
| :--- |
| : C:\printerdriver\development\images\image 1.bmp | where "printerdriver" is a file name, "image1" is label data and C:\printerdriver\development\images\image1.bmp is the storage location of a bit map file.

Figure 7:
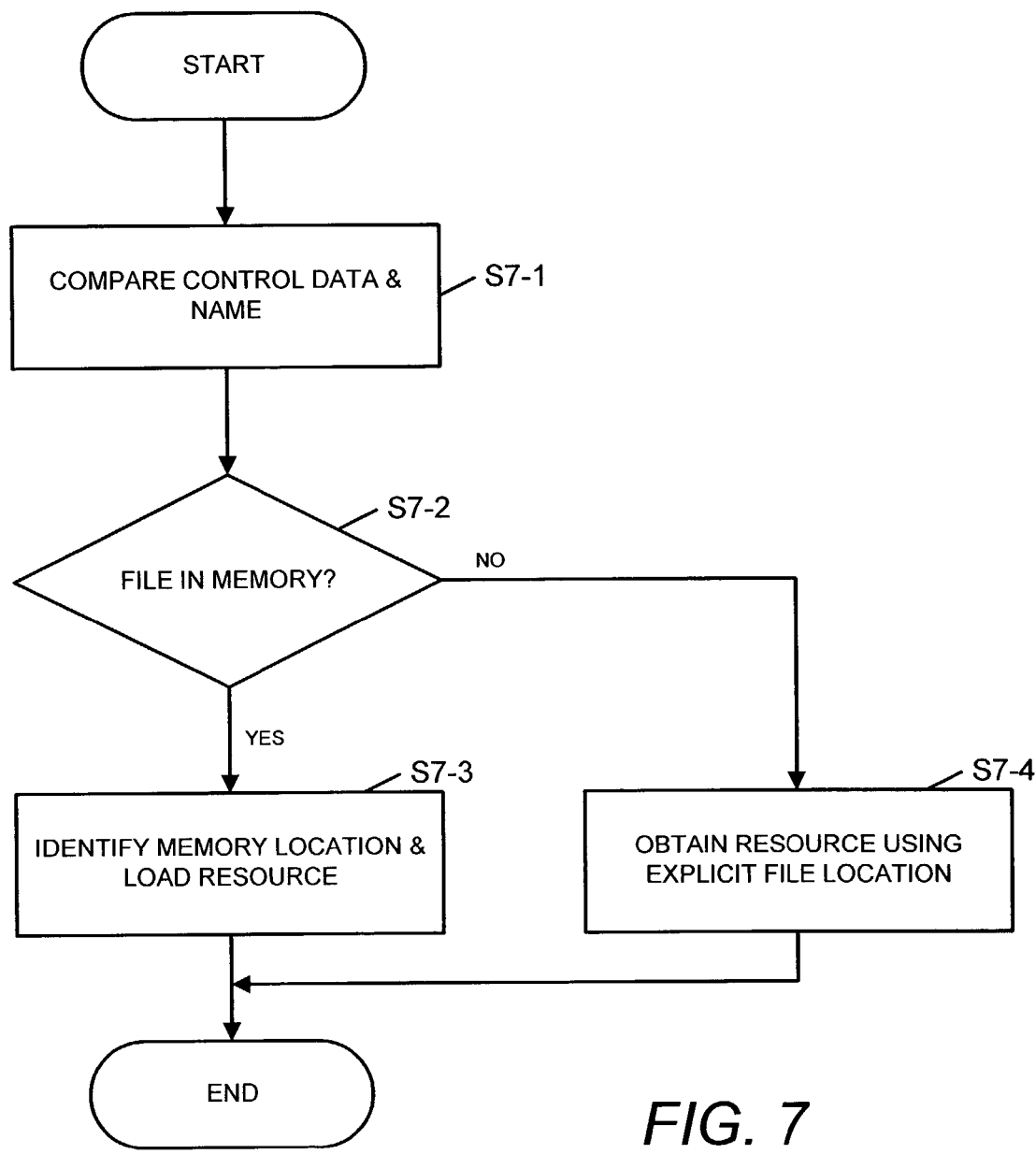
FIG. 7 is a flow diagram of the processing of the bound resource processing module of a second embodiment of the present invention.

The processing of a modified bound resource processing module 30 in accordance with this embodiment of the present invention will now be described with reference to FIG. 7.

When the modified bound resource processing module 30 is invoked, in this embodiment, the bound resource processing module 30 initially compares (S7-1) the file name included in a URL to be processed by the bound resource processing module 30 with control data 36 in memory 9.

When the file name matching the file name in the URL being processed is found within the bound resource control data 36. The bound resource processing module 30 then (S7-2) determines whether the file name in the bound resource control data 36 is stored in association with data identifying a memory location or data identifying a file location. Whether data stored in association with a name identifies a memory location or a file location will be dependent upon whether the resource control data 36 in question has been generated utilizing the initialisation module 32 or alternatively by an administration module enabling direct input of data identifying file locations.

If the data associated with a name for a part of the bound resource URL is determined to be a memory location, the control data 36 is processed together with the remainder of a bound resource URL as has been previously described in relation to the first embodiment (S7-3).

If, however, the bound resource control data 36 stored in association with the identified name data and label data comprises data identifying a file location, in this embodiment the bound resource processing module 30 then proceeds to access data stored at the identified file location.

Thus in this way data stored outside a bound application file can be accessed. In particular, whilst an application file is in development references to the names of files which will later be included in the final version of the application file may be referred to by bound resource URLs.

When development of a particular application file has been completed, all of the files making up an application file can be included in a single application file. At this point, it will become possible to search for all resources included within the version of application file using label data to identify the location of the resources. The references to files for which manual control data had previously been entered using an administration module can therefore be processed in the absence of the manual control data as has been described in the first embodiment.

Third Embodiment

A third embodiment of the present invention will now be described. In the previous embodiments, once the location of an application file has been determined utilizing bound resource control data 36 a bound resource within the application file is selected for processing based upon searching for matching of a label data included in the URL being processed. In contrast, in this embodiment, the URL's being processed are made to comprise a first portion identifying an application file and a second portion being an offset value identifying the location of a bound resource within the identified application file.

Thus for example a URL for a bound resource in this embodiment might be of the form:

br:\\printerdriver\#01000 where "printerdriver" is the name of an application file and #01000 is an offset identifying the relative location of a bound resource within the application file relative to the start of the application file "printerdriver".

In this embodiment, when a bound resource URL is processed, the actual storage location of an application file is determined in the same way as has been described in the first two embodiments, using bound resource control data 36 generated by an initialisation module 32. However once the location of an application file has been determined instead of searching for data corresponding to label data, in this embodiment the processing module 30 automatically selects for processing a resource found at a memory location identified by the sum of the offset value and the memory location associated with the name portion of the URL by the stored resource control data 36.

Thus for example when processing a bound resource protocol URL:

br:\\printerdriver\#00100

If the initialisation module 32 has previously stored data corresponding to the location of a file "printerdriver" and memory location #96AEF, the bound resource processing module would determine as the memory location of the resource to be processed, the memory location #00100+#96AEF=#96BEF.

The bound resource processing module 30 then processes the resource at the identified storage location in a conventional manner.

Thus in this way, whilst the URLs to be processed by a protocol handler 12 comprise data identifying a file name and a relative location within a named file, the bound resource processing module 30 is able to convert these URLs into explicit URLs identifying actual storage locations whenever the browser program 10 causes the protocol handler 12 to process reference to such bound resources.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. Data processing apparatus for retrieving data in accordance with received access requests including a protocol identifier and a location identifier, said apparatus comprising:
   a receiver for receiving access requests including a protocol identifier and a location identifier;
   a plurality of protocol processing modules for retrieving data utilizing location identifiers received by said receiver, and
   selection means for selecting from said protocol processing modules a processing module to process a received access request on the basis of the said protocol identifier included in said received access request;
   wherein at least one of protocol processing modules is operable to process location identifiers comprising resource identification data and fixed predetermined identification data corresponding to a file, said at least one protocol processing module comprising:
      monitoring means arranged to detect the storage of files in a file storage system;
      means responsive to the monitoring means to store fixed predetermined identification data corresponding to a said file in association with data identifying the location of storage of a file being stored;
      conversion means for converting file identifiers into data identifying a storage location utilizing said data stored by said responsive means; and
      retrieval means for retrieving resource data stored in said file storage system utilizing said data identifying a storage location identified by conversion of the file identifier of said location identifier by said conversion means and said resource identification data.

2. Apparatus in accordance with claim 1 wherein said retrieval means comprises:
   matching means for identifying the location of stored data corresponding to said resource identification data of said location identifier said matching means being adapted to perform a search for said data within said file storage system starting said search from the storage location identified by the conversion of the file identifier of said location identifier by said conversion means; and
   output means for outputting resource data stored adjacent to said location identified by said matching means.

3. Apparatus in accordance with claim 1 wherein said at least one protocol processing module is operable to process location identifiers comprising resource identification data wherein said resource identification data comprises offset data, said retrieval means being adapted to retrieve resource data from the location of storage corresponding to the relative storage location identified by said offset data relative to said storage location identified by conversion of the file identifier of said location identifier by said conversion means.

4. Apparatus in accordance with claim 1, further comprising:
   input means for inputting and storing storage location data in association with a location identifier comprising resource identification data and fixed predetermined identification data corresponding to a file, wherein said at least one protocol processing module is operable to process location identifiers corresponding to stored resource identification data and fixed predetermined identification data by accessing resource data from said location identified by said storage location data.

5. Apparatus in accordance with claim 4, wherein said storage location data identifies a storage location corresponding to a file in a remote data store.

6. A method of retrieving resource data in accordance with received access requests comprising the steps of:
   when a file is stored, storing fixed predetermined identification data corresponding to said file in association with data identifying the location of storage of said file; and
   processing a received access request comprising a protocol identifier and a location identifier, said location identifier comprising resource identification data and fixed predetermined identification data corresponding to a file by:
      selecting a processing module to process said received access request on the basis of said protocol identifier; and
      processing said location identifier utilizing said selected protocol processing module by converting said fixed predetermined identification data into data identifying in a storage location utilizing said data stored when a file is stored; and
      retrieving resource data stored in said file storage system utilizing said data identifying a storage location and said resource identification data of said access request.

7. A method in accordance with claim 6, wherein said retrieval of resource data comprises the steps of identifying the location of stored data corresponding to said resource identification data of said location identifier by performing a search for said data within said file storage system starting from the storage location identified by the conversion of the file identifier of said location identifier.

8. A method in accordance with claim 6, wherein said retrieval of said resource data comprises retrieving data stored in a storage location corresponding to the relative storage location identified by said resource identification data relative to the location of storage identified by conversion of the file identifier of said location identifier.

9. A method in accordance with claim 6, further comprising the steps of inputting and storing storage location data in association with a location identifier comprising resource identification data and fixed predetermined identification data corresponding to a file; and processing an access request comprising a location identifier corresponding to a stored resource identification data and fixed predetermined identification data by accessing resource data from the location identified by said associated stored storage location data.

10. A method in accordance with claim 9, wherein said storage location data identifies a remote data store and a said retrieval of said resource data comprises retrieving a file from the remote data store identified by said storage location data.

11. A data carrier storing computer implementable process steps for generating within a programmable computer data processing apparatus in accordance with any of claims 1 to 5 or for causing a programmable computer to perform a method of retrieving resource data in accordance with any of claims 6 to 10.

12. A data carrier in accordance with claim 11, comprising a computer disk.

13. A data carrier in accordance with claim 11, comprising an electric signal transferred via the Internet.

14. A computer disk in accordance with claim 12, wherein said computer disk comprises and optical, magneto-optical or magnetic disk.

* * * * *